United States Patent
Kim et al.

(10) Patent No.: US 8,179,456 B2
(45) Date of Patent: May 15, 2012

(54) IMAGE SENSORS, COLOR FILTER ARRAYS INCLUDED IN THE IMAGE SENSORS, AND IMAGE PICKUP APPARATUSES INCLUDING THE IMAGE SENSORS

(75) Inventors: Jung-yeon Kim, Busan (KR); Hiromichi Tanaka, Suwon-si (KR)

(73) Assignee: Samsung Electronics Co., Ltd, Gyeonggi-Do (KR)

( * ) Notice: Subject to any disclaimer, the term of this patent is extended or adjusted under 35 U.S.C. 154(b) by 782 days.

(21) Appl. No.: 12/289,812

(22) Filed: Nov. 5, 2008

(65) Prior Publication Data
US 2009/0115874 A1    May 7, 2009

(30) Foreign Application Priority Data
Nov. 5, 2007    (KR) .......................... 10-2007-0112303

(51) Int. Cl.
*H04N 5/335*    (2006.01)
(52) U.S. Cl. .......................... 348/273; 348/277; 348/280
(58) Field of Classification Search ................... 348/273, 348/277, 280
See application file for complete search history.

(56) References Cited

U.S. PATENT DOCUMENTS

| | | | | |
|---|---|---|---|---|
| 5,329,388 A | * | 7/1994 | Yoshimizu | 349/80 |
| 2002/0021363 A1 | * | 2/2002 | Jaspers | 348/273 |
| 2002/0126330 A1 | * | 9/2002 | Farrell | 358/538 |
| 2006/0066922 A1 | * | 3/2006 | Nishi | 358/482 |
| 2006/0284989 A1 | * | 12/2006 | Kang et al. | 348/222.1 |

FOREIGN PATENT DOCUMENTS

| | | |
|---|---|---|
| JP | 58-100589 | 6/1983 |
| JP | 60-142690 | 7/1985 |
| JP | 06-125562 | 5/1994 |
| JP | 2000-032476 | 1/2000 |

* cited by examiner

*Primary Examiner* — Usman Khan
(74) *Attorney, Agent, or Firm* — Harness, Dickey & Pierce, PLC

(57) ABSTRACT

A color filter array may include two or more yellow filter pixels, one or more green filter pixels, and one or more cyan filter pixels. The two or more yellow filter pixels may be disposed in a first row or rows in a first direction. The one or more green filter pixels and the one or more cyan filter pixels may be disposed in a second row or rows in the first direction. The first row or rows and the second row or rows may alternate in a second direction perpendicular to the first direction. In the second direction, either the one or more green filter pixels and at least one of the two or more yellow filter pixels alternate or the one or more cyan filter pixels and at least one of the two or more yellow filter pixels alternate.

20 Claims, 14 Drawing Sheets

IMAGE SENSORS, COLOR FILTER ARRAYS INCLUDED IN THE IMAGE SENSORS, AND IMAGE PICKUP APPARATUSES INCLUDING THE IMAGE SENSORS

PRIORITY STATEMENT

This application claims priority from Korean Patent Application No. 10-2007-0112303, field on Nov. 5, 2007, in the Korean Intellectual Property Office (KIPO), the entire contents of which are incorporated herein by reference.

BACKGROUND

1. Field

Example embodiments relate to image pickup apparatuses. Also, example embodiments relate to image sensors, color filter arrays included in the image sensors, and image pickup apparatuses including the image sensors, in order to reduce crosstalk effects between pixels of the image sensors.

2. Description of Related Art

An image pickup apparatus is an apparatus that converts an optical signal into an electrical signal. To this end, the image pickup apparatus includes a photo sensing unit that converts an optical signal into an electrical signal. Image pickup apparatuses can be classified into charge-coupled devices (CCDs) and complementary metal-oxide semiconductor (CMOS) image sensors (CIS), according to the type of the photo sensing unit. The CIS type is currently used in a large number of fields, in substitution for the CCD type, because of the CIS type's characteristics of low-voltage operation, lower power consumption, standard complimentary metal oxide semiconductor (CMOS) process, and high integration as compared with the CCD type.

A CIS type solid image pickup apparatus may be installed in a mobile camera, a digital still camera, etc., and picks up images and converts them into electrical signals to send them to a digital signal processing unit. The digital signal processing unit processes color image data (R, G, B data) that is output from the solid image pickup apparatus to drive a display device, such as a liquid crystal display (LCD).

Since a photo sensing device generally senses only the intensity of optical signals and not the spectral characteristics of the optical signals, the photo sensing device only passes optical signals, within a frequency range or ranges, through color filters. Thus, color filters and photo sensing devices are provided with respect to a number of frequency ranges, thereby evaluating the intensity of optical signals for each of the frequency ranges and obtaining color image data (R, G and B data) from the intensity of the optical signals.

SUMMARY

Example embodiments may provide color filter arrays with improved photosensitivity, image sensors including the color filter arrays, and/or image pickup apparatuses including the image sensors.

Example embodiments also may provide color filter arrays that compensate color changes in advance due to crosstalk to reduce the influence of the crosstalk between pixels, image sensors including the color filter arrays, and/or image pickup apparatuses including the image sensors.

According to example embodiments, an image sensor may include: a microlens; a color filter array; and/or a photo sensing unit. The microlens may be adapted to gather optical signals incident from a light source. The color filter array may be adapted to receive the optical signals that have passed through the microlens. The color filter array may be further adapted to transmit only optical signals within a frequency range. The photo sensing unit may be adapted to receive the optical signals from the color filter array in order to generate electrical signals depending on an intensity of the optical signals. The color filter array may comprise: yellow filter pixels; green filter pixels; and/or cyan filter pixels. The yellow filter pixels may be disposed in first rows in a first direction. The green filter pixels and the cyan filter pixels may be disposed in second rows in the first direction. The first rows and the second rows may alternate in a second direction perpendicular to the first direction. In the second direction, either the green filter pixels and the yellow filter pixels may alternate or the cyan filter pixels and the yellow filter pixels may alternate.

According to example embodiments, a color filter array may include: two or more yellow filter pixels; one or more green filter pixels; and one or more cyan filter pixels. The two or more yellow filter pixels may be disposed in a first row or rows in a first direction. The one or more green filter pixels and the one or more cyan filter pixels may be disposed in a second row or rows in the first direction. The first row or rows and the second row or rows may alternate in a second direction perpendicular to the first direction. In the second direction, either the one or more green filter pixels and at least one of the two or more yellow filter pixels may alternate or the one or more cyan filter pixels and at least one of the two or more yellow filter pixels may alternate.

According to example embodiments, an image pickup apparatus may include: an image sensor including a color filter; and/or a signal processing unit. The color filter may include: two or more yellow filter pixels; one or more green filter pixels; and/or one or more cyan filter pixels. The two or more yellow filter pixels may be disposed in a first row or rows in a first direction. The one or more green filter pixels and the one or more cyan filter pixels may be disposed in a second row or rows in the first direction. The first row or rows and the second row or rows may alternate in a second direction perpendicular to the first direction. In the second direction, either the one or more green filter pixels and at least one of the two or more yellow filter pixels may alternate or the one or more cyan filter pixels and at least one of the two or more yellow filter pixels may alternate. The image sensor may output signals with respect to sub-pixels for each pixel. The signal processing unit may be adapted to convert the signals output from each of the pixels into a red output, a green output, and a blue output. The signal processing unit may further be adapted to output the red output, the green output, and the blue output.

BRIEF DESCRIPTION OF THE DRAWINGS

The above and/or other aspects and advantages will become more apparent and more readily appreciated from the following detailed description of example embodiments taken in conjunction with the accompanying drawings, in which.

DETAILED DESCRIPTION OF EXAMPLE EMBODIMENTS

Figure 1:
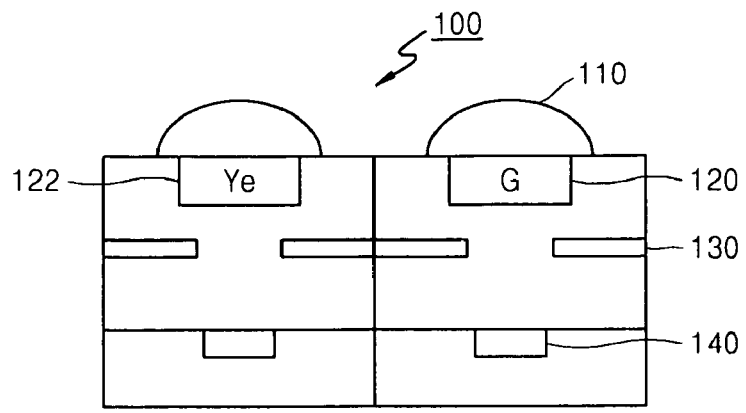
FIG. 1 is a cross-sectional view of an image sensor according to example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components. Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a cross-sectional view of an image sensor 100 according to example embodiments.

Referring to FIG. 1, the image sensor 100 may include microlens 110 for gathering light incident from a light source, color filter arrays 120 and 122 that transmit only optical signals within a frequency range, light shield layer 130 for preventing the optical signals being incident to areas other than photo sensing unit 140, and/or photo sensing unit 140 for receiving optical signals from color filter arrays 120 and 122 in order to generate electrical signals according to the intensity of the incident optical signals.

Since photo sensing unit 140 may merely sense the intensity of optical signals, and may not sense the frequency of the optical signals, color filter arrays 120 and 122 may transmit only optical signals within the frequency ranges and/or may transmit the optical signals to photo sensing unit 140, and/or photo sensing unit 140 may generate electrical signals according to the intensity of the optical signals with the frequency ranges. For example, the greater the intensity of the optical signals, the greater the current generated in photo sensing unit 140, if the intensity of optical signal is above a threshold value. Photo sensing unit 140 may be any device capable of converting an optical signal into an electrical signal. For example, photo sensing unit 140 may be a photodiode.

Figure 2A:
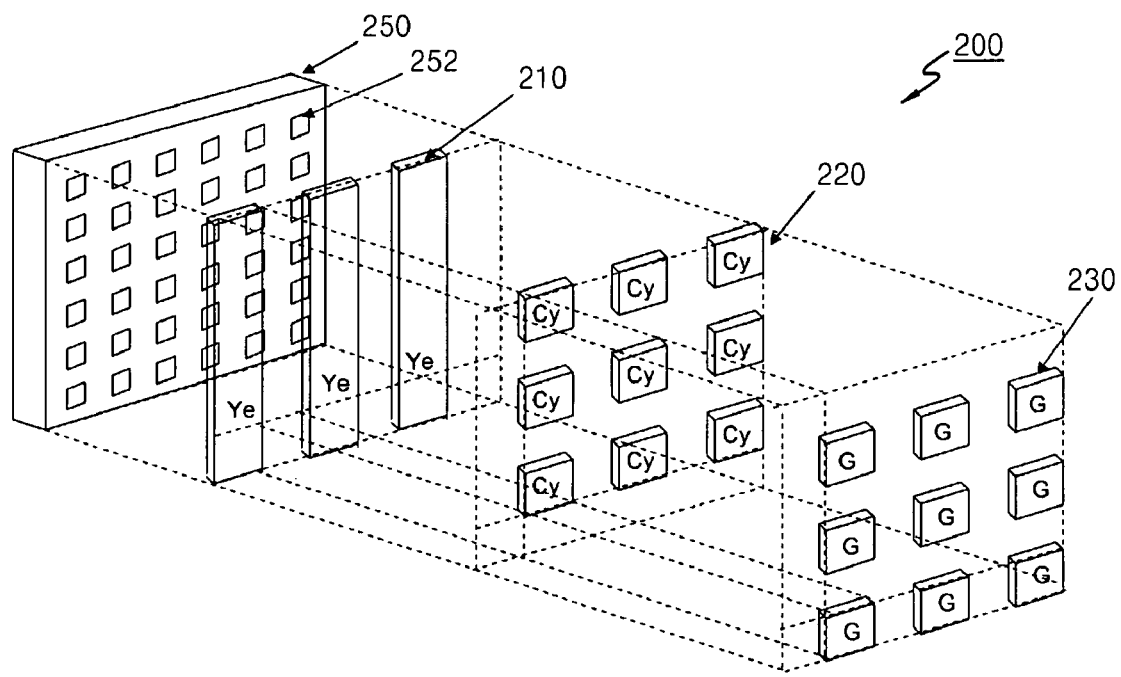
FIGS. 2A and 2B illustrate a color filter array according to example embodiments.
Figure 2B:
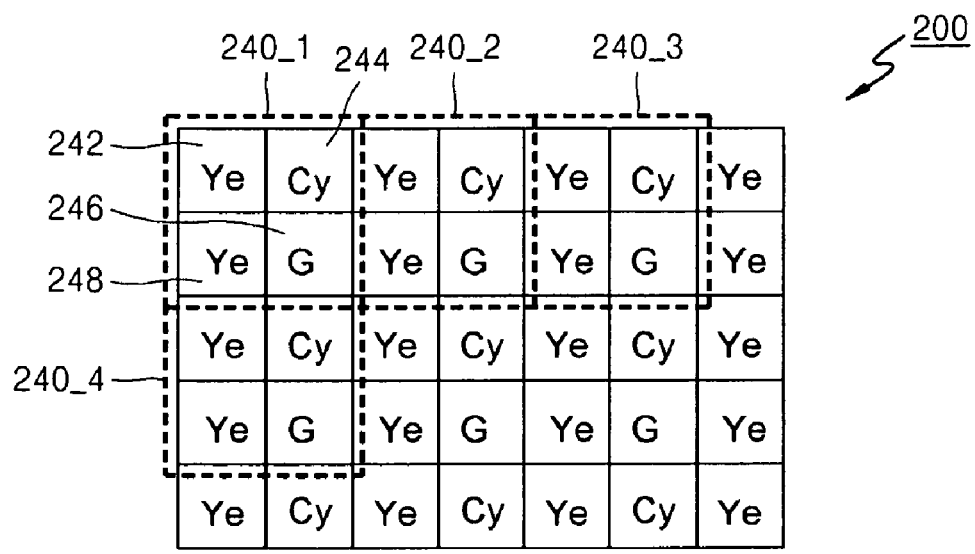

FIGS. 2A and 2B illustrate a color filter array 200 according to example embodiments.

Referring to FIGS. 2A and 2B, color filter array 200 according to example embodiments may include yellow filter pixel array 210, cyan filter pixel array 220, green filter pixel array 230, and/or photo sensing unit array 250. Although yellow filter pixel array 210, cyan filter pixel array 220, and green filter pixel array 230 are illustrated in FIG. 2A as being on different planes for explanation purposes, yellow filter pixel array 210, cyan filter pixel array 220, and/or green filter pixel array 230 may be formed on one plane in practice, as illustrated in FIG. 2B.

The pixels of yellow filter pixel array 210, cyan filter pixel array 220, and green filter pixel array 230 correspond to a plurality of photo sensing units 252 on photo sensing unit array 250.

Color filter array 200 may be formed of repeated unit pixels 240_1, 240_2, 240_3, and 240_4, that may be respectively formed of four sub-pixels 242, 244, 246, and 248. Each of sub-pixels 242, 244, 246, and 248 may include a color filter having a surface area. The four sub-pixels included in each of unit pixels 240_1, 240_2, 240_3, and 240_4 may correspond to two yellow filter pixels 242 and 248, one cyan filter pixel 244, and one green filter pixel 246. Since these three kinds of color filters all may include green components, they may transmit a lot of luminance components of incident light, thereby increasing sensitivity. In particular, as pixels of an image sensor become more highly integrated to obtain a high quality image, the cell size in the image sensor may be reduced, and thus the intensity of an optical signal input to a given pixel may be reduced. If the signal is amplified, a signal-to-noise ratio (SNR) may be decreased. According to example embodiments, since color filter array 200 may transmit more luminance components, the performance of a highly integrated image sensor may be improved.

Four sub-pixels 242, 244, 246, 248 included in each unit pixel 240 may be arranged in a 2×2 matrix. Two yellow filter pixels 242 and 248 may be disposed, for example, in a stripe manner, with cyan filter pixel 244 and green filter pixel 246 disposed in the remaining two regions. Thus, for example, yellow filter pixels 242 and 248 may be disposed in a first direction, cyan filter pixel 244 and green filter pixel 246 also may be disposed in the first direction.

Figure 3A:
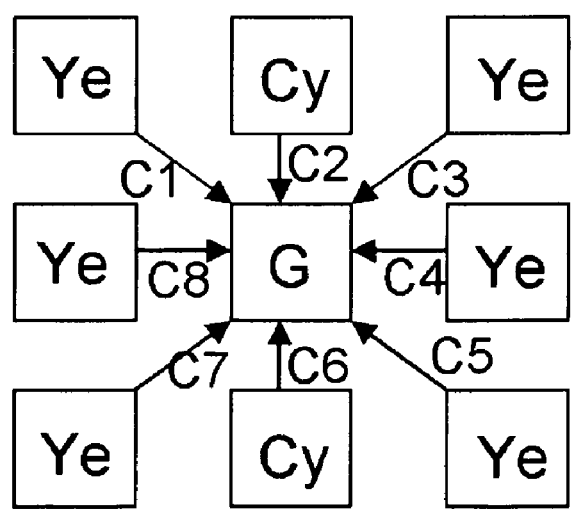
FIGS. 3A through 3C illustrate a process of calculating a frequency characteristic of a green filter pixel, for compensating influence of crosstalk on the green filter pixel in advance, according to example embodiments.
Figure 3B:
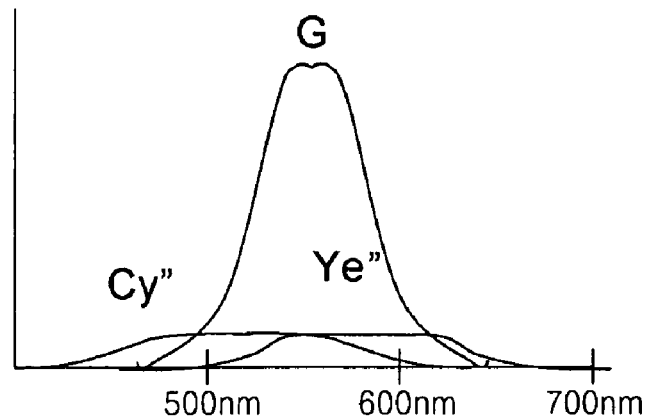
Figure 3C:
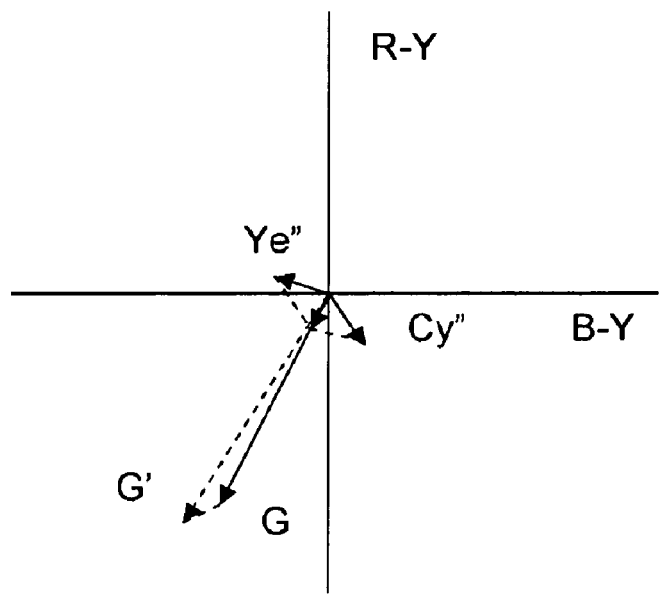

FIGS. 3A through 3C illustrate a process of calculating a frequency characteristic of a green filter pixel, for compensating influence of crosstalk on the green filter pixel in advance, according to example embodiments.

As the pixels of an image sensor become more highly integrated to obtain a high quality image, the pixel size in the image sensor may be reduced, and thus crosstalk between the pixels may be increased. Crosstalk means that an arbitrary pixel is affected by a signal generated in an adjacent pixel, and therefore, the spectral characteristic of a signal generated in the arbitrary pixel is changed, thereby deteriorating color reproductivity. In order to overcome this problem, a color compensation circuit is used in a conventional image sensor to compensate the degraded color reproducibility caused by the crosstalk. However, since the color compensation circuit uses an amplifier and a matrix circuit, the noise is amplified and thus SNR is reduced, which limits color reproducibility.

According to example embodiments, when optical signals inputted in the image sensor are converted into electrical signals, a color filter array may compensate in advance for a change in color due to crosstalk in order to enhance color reproductivity by compensating for a phenomenon that the spectral characteristics of the electrical signals are different from those of the inputted optical signals due to the crosstalk. Since the spectral characteristics in the color filter array may be determined by absorption spectra of color filters, the absorption spectra of the color filters may be controlled to compensate in advance for the crosstalk effect in example embodiments. Since the absorption spectra of the color filters may be determined by the components and/or composition ratio of the pigments constituting the color filters, the absorption spectra of the color filters may be controlled by adjusting the components and/or the composition ratio of the pigments.

FIGS. 3A through 3C illustrate a process of adjusting the spectral characteristic of a green filter pixel, FIGS. 4A through 4E illustrate a process of adjusting the spectral characteristic of a cyan filter pixel, FIGS. 5A through 5F illustrate a process of adjusting the spectral characteristic of a first yellow filter pixel, and FIGS. 6A through 6D illustrate a process of adjusting the spectral characteristic of a second yellow filter pixel.

FIG. 3A illustrates a green filter pixel and pixels adjacent thereto. The green filter pixel may be influenced by crosstalk generated from yellow filter pixels on the left and right of the green filter pixel, cyan filter pixels above and below the green filter pixel, and other yellow filter pixels diagonally adjacent to the green filter pixel. Crosstalk components of the yellow filter pixels on the left and right of the green filter pixel may be referred to as Ye″, crosstalk components of the cyan filter pixels above and below the green filter pixel may be referred to as Cy″, and crosstalk components of the yellow filter pixels diagonally adjacent to the green filter pixel may be referred to as Ye2″. Also, when the crosstalk components from all of the adjacent pixels are referred to as C1 through C8 as illustrated in FIG. 3A, the crosstalk components Cy″, Ye″, and Ye2″ may be expressed respectively as in Equation 1.

$$Ye''=C4+C8$$

$$Cy''=C2+C6$$

$$Ye2''=C1+C3+C5+C7 \quad \text{[Equation 1]}$$

If an optical signal transmitted by the green filter pixel when no crosstalk is generated is referred to as G, an optical signal G' that may be transmitted by the green filter pixel in the presence of crosstalk may be expressed by Equation 2 below.

$$G'=G+Ye''+Cy''+Ye2'' \quad \text{[Equation 2]}$$

Here, crosstalk components Ye2″ of the yellow filter pixels diagonally adjacent to the green filter pixel may be ignored as they may be small when compared to the crosstalk components Ye″ and Cy″.

FIG. 3B is a graph showing the spectral characteristics of the green filter pixel and crosstalk components Ye″ and Cy″ that may influence the green filter pixel. The horizontal axis denotes wavelength (in nanometers) and the vertical axis denotes photosensitivity. As illustrated in FIG. 3B, because crosstalk components Ye″ and Cy″ may include a lot of green components like G, they may not significantly change the spectral characteristic of G'.

FIG. 3C illustrates G, G', Ye″, and Cy″ in vector form in a color space, as well as a fifth vector representing the vector sum of Ye″+Cy″. A color space refers to a space in which colors may be represented by coordinates. There are various color spaces according to coordinate systems, and one color can be expressed in a variety of color spaces. In this specification, the phase and magnitude of optical signals may be illustrated using a color space of blue-yellow (B-Y) and red-yellow (R-Y) coordinate systems, as illustrated in FIG. 3C.

G, denoting an optical signal that may be transmitted by the green filter pixel without being influenced by crosstalk, may be shifted to G' due to crosstalk Ye″ caused by the adjacent yellow filter pixels and/or crosstalk Cy″ caused by the adjacent cyan filter pixels. The phase shift between G and G' may be relatively small, but the magnitude of G may be changed to G', for example, in an increasing direction. Consequently, despite considering crosstalk components Ye″ and Cy″, the phase of G' may be hardly changed when compared to G, and the SNR of G may be increased.

G' may be calculated as follows while considering crosstalk components Ye″ and Cy″. G' may be calculated, for example, by assuming the magnitude of crosstalk components Ye″ and Cy″ as −16 dB (=0.15) of the magnitude of optical signal G, respectively. Ye and Cy may be respectively expressed with R, G, and B as in Equation 3 below.

$$Ye=G+R$$

$$Cy=G+B \quad \text{[Equation 3]}$$

Considering crosstalk components, G' may be expressed by Equation 4 below.

$$G' = G + Ye'' + Cy''$$
$$= G + 0.15Ye + 0.15Cy$$
$$= G + 0.15(G + R) + 0.15(G + B)$$
$$= 1.3G + 0.15R + 0.15B$$
[Equation 4]

Accordingly, as R and B components may be weak relative to G, the magnitude of G may be increased, the phase of G may be hardly changed, and/or the SNR may be increased.

FIGS. 4A through 4E illustrate a process of calculating a frequency characteristic of a cyan filter pixel, for compensating influence of crosstalk on the cyan filter pixel in advance, according to example embodiments.

Figure 4A:
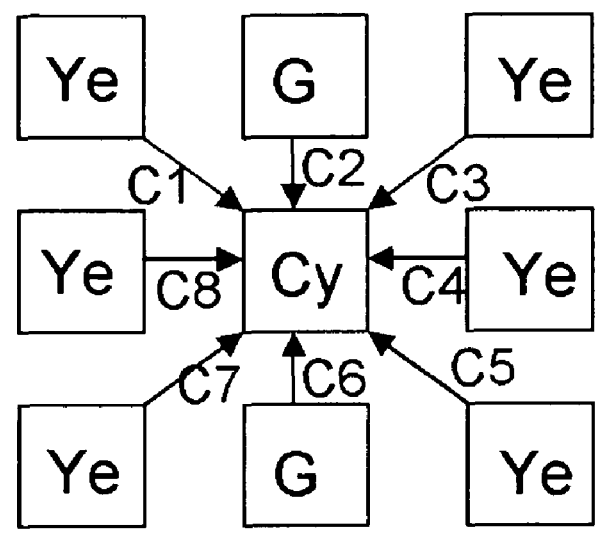
FIGS. 4A through 4E illustrate a process of calculating a frequency characteristic of a cyan filter pixel, for compensating influence of crosstalk on the cyan filter pixel in advance, according to example embodiments.

FIG. 4A illustrates a cyan filter pixel and pixels adjacent thereto. The cyan filter pixel may be influenced by crosstalk generated from green filter pixels above and below the cyan filter pixel, yellow filter pixels on the left and right of the cyan filter pixel, and/or yellow filter pixels diagonally adjacent to the cyan filter pixel. Crosstalk components from the green filter pixels above and below the cyan filter pixel may be referred to as G", crosstalk components from the yellow filter pixels on the left and right of the cyan filter pixel may be referred to as Ye", and crosstalk components from the yellow filter pixels diagonally adjacent to the cyan filter pixel may be referred to as Ye2". Also, when the crosstalk components from all of the adjacent pixels are referred to as C1 through C8 as illustrated in FIG. 4A, the crosstalk components Cy", Ye", and Ye2" may be expressed respectively as in Equation 5 below.

$$G''=C2+C6$$
$$Ye''=C4+C8$$
$$Ye2''=C1+C3+C5+C7$$
[Equation 5]

If an optical signal transmitted by the cyan filter pixel when no crosstalk is generated is referred to as Cy, an optical signal Cy' that may be transmitted by the cyan filter pixel in the presence of crosstalk may be expressed by Equation 6 below.

$$Cy'=Cy+Ye''+G''+Ye2''$$
[Equation 6]

Here, the crosstalk components Ye2" of the yellow filter pixels diagonally adjacent to the cyan filter pixel may be ignored as they may be small when compared to the crosstalk components Ye" and G".

Figure 4B:
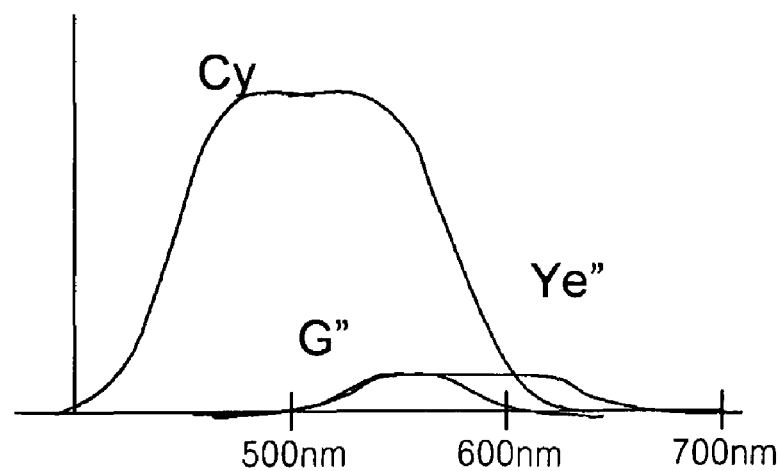

FIG. 4B is a graph showing the spectral characteristics of the cyan filter pixel and the crosstalk components Ye" and G" that may influence the cyan filter pixel. The horizontal axis denotes wavelength (in nanometers) and the vertical axis denotes photosensitivity. Since the crosstalk components generated from the yellow filter pixels and the green filter pixels have different spectrums from the cyan filter pixel, it may be predicted that the spectral characteristic of the cyan filter pixel may be changed due to the crosstalk generated from the yellow filter pixels and/or the green filter pixels.

Figure 4C:
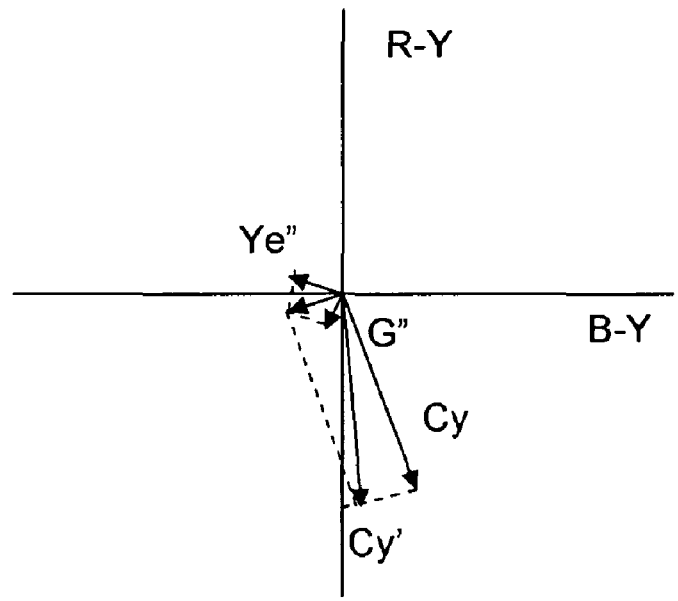

FIG. 4C illustrates Cy, Cy', Ye", and G" in vector form in a color space, as well as a fifth vector representing the vector sum of Ye"+G". Cy, denoting an optical signal that may be transmitted through the cyan filter pixel without being influenced by crosstalk, may be shifted to Cy' due to the crosstalk Ye" caused by the adjacent yellow filter pixels and/or the crosstalk G" caused by the adjacent green filter pixels. Here, the phase of Cy may be shifted by crosstalk, but its vector magnitude may be hardly changed, and thus the optical signal may not be decreased in magnitude. However, Cy may be shifted to Cy' in phase, which may indicate that the spectral characteristic of the optical signal is changed due to crosstalk. Thus, in example embodiments, in order to return to Cy, the influence of crosstalk may be compensated in advance.

First, a process of calculating phase in the color space of FIG. 4C will be described using exemplary values. For example, when the crosstalk component G" generated from the green filter pixel above and below the cyan filter pixel and the crosstalk component Ye" generated from the yellow filter pixel left and right of the cyan filter pixel are assumed to be both −16 dB (=0.15) and the angle between G" and Ye" is assumed to be 90°, the magnitude of the sum of vectors of G" and Ye" may be expressed by Equation 7 below.

$$|Ye''+G''|=0.15*\sqrt{2}=0.21$$
[Equation 7]

Here, when the phase angle between the sum of the crosstalk components (Ye"+G") and Cy is assumed to be perpendicular, the phase angle between Cy and Cy' may be $\tan^{-1}(0.21)=12°$ (approximately). Accordingly, in order to compensate the influence of crosstalk on the cyan filter pixel in advance, the spectral characteristic of the cyan filter pixel may be compensated in advance by approximately 12° in the color space in order to reduce the influence of the crosstalk.

Figure 4D:
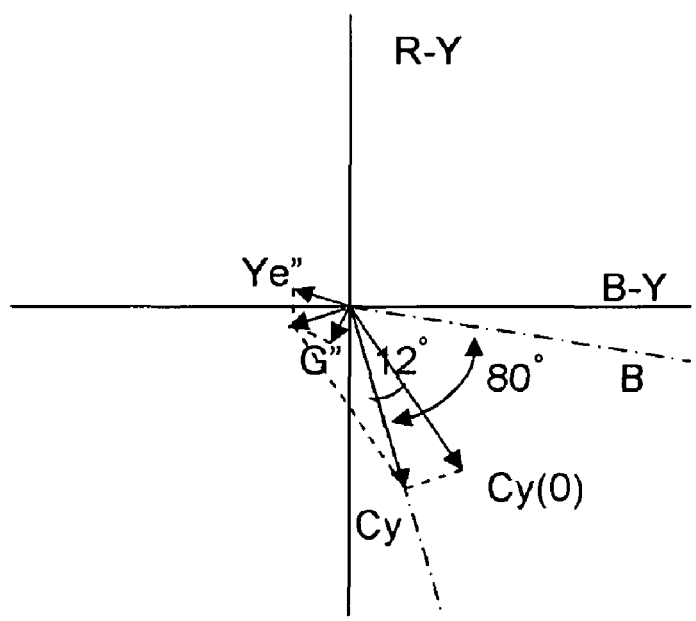
Figure 4E:
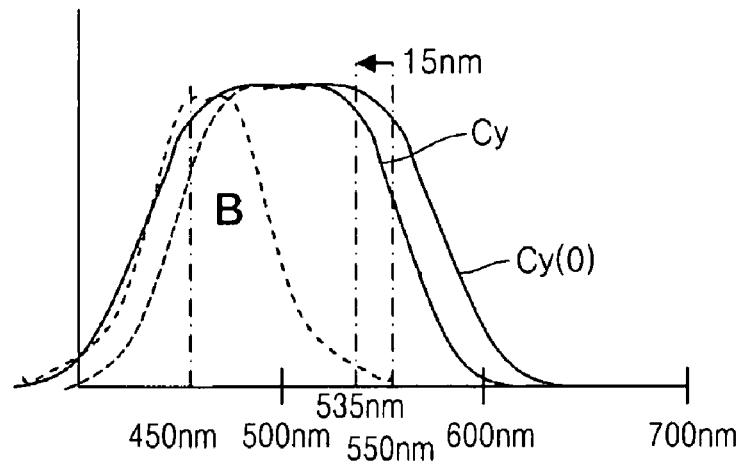

By using FIGS. 4D and 4E, the shift amount of the spectral characteristic of the cyan filter pixel on a frequency axis may be calculated. The shift amount on the frequency (wavelength) axis may be calculated using the vector and spectral characteristics representing blue (B) in order to convert the phase in the color space into values on the frequency (wavelength) axis. Blue (B) may be present in a color space having an angle of approximately 80° with a Cy vector, as illustrated in FIG. 4D. Also, as illustrated in FIG. 4E, blue (B) may have a spectral characteristic having a maximum photosensitivity at a wavelength of about 450 nm. As Cy is shifted away from the blue (B) due to the crosstalk Ye" and G", in order to compensate this crosstalk effect, the spectral characteristic of the cyan filter pixel may need to be shifted in advance by approximately 12° toward the blue (B) in the color space. A frequency (wavelength) interval corresponding to approximately 12° in the color space may be calculated using Equation 8 below (in which 550 nm may represent, for example, a wavelength corresponding to a higher cutoff frequency of Cy(0)).

$$\Delta(Cy)=(550\ nm-450\ nm)*(12°/80°)=15\ nm$$
[Equation 8]

Accordingly, the spectral characteristic of the cyan filter pixel may be Cy(0), where Cy(0) may be shifted by about 15 nm toward blue (B) from Cy, as illustrated in FIG. 4E.

FIGS. 5A through 5F illustrate a process of calculating a frequency characteristic of a first yellow filter pixel, for compensating influence of crosstalk on the first yellow filter pixel in advance, according to example embodiments.

According to example embodiments, yellow filter pixels may be disposed, for example, in a stripe manner. However, since cyan filter pixels and green filter pixels are alternately arranged between the yellow filter pixels, two kinds of yellow filter pixels exist. These two kinds of yellow filter pixels may be classified into first yellow filter pixels, disposed between green filter pixels on the left and right (with cyan filter pixels diagonally adjacent), and second yellow filter pixels, disposed between the first yellow filter pixels above and below and between cyan filter pixels on the left and right (with green filter pixels diagonally adjacent). Although all the yellow filter pixels should show identical spectral characteristics in substance, optical signals that have been transmitted through the first yellow filter pixel and the second yellow filter pixel may, however, show different spectral characteristics due to the influence of crosstalk generated from adjacent filter pixels. These differences between the spectral characteristics of the first and second yellow filter pixels may be removed by taking an average during a signal processing operation, but since these differences may need to be taken into account during a process to compensate the influences of crosstalk in advance, the first yellow filter pixels and the second yellow filter pixels will be respectively described below.

Figure 5A:
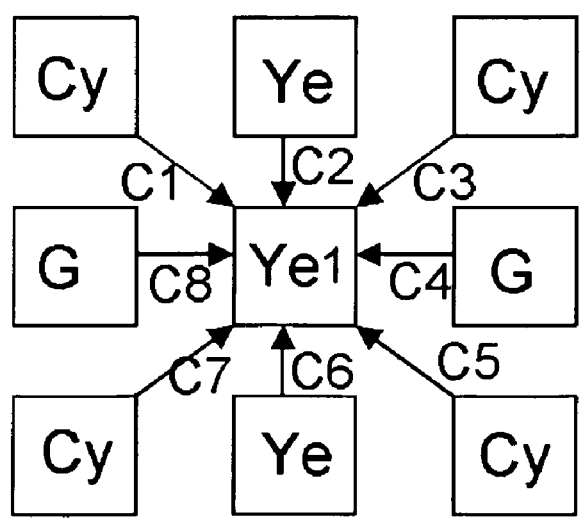
FIGS. 5A through 5F illustrate a process of calculating a frequency characteristic of a first yellow filter pixel, for compensating influence of crosstalk on the first yellow filter pixel in advance, according to example embodiments.

FIG. 5A illustrate a first yellow filter pixel and pixels adjacent thereto. The first yellow filter pixel may be influenced by crosstalk generated from second yellow filter pixels above and below the first yellow filter pixel, green filter pixels on the left and right of the first yellow filter pixel, and/or cyan filter pixels diagonally adjacent to the first yellow filter pixel. Crosstalk components from the second yellow filter pixels above and below the first yellow filter pixel may be referred to as Ye", crosstalk components from the green filter pixels on the left and right of the first yellow filter pixel may be referred to as G", and crosstalk components from the cyan filter pixels diagonally adjacent to the first yellow filter pixel may be referred to as Cy". Also, when the crosstalk components from all of the adjacent pixels are referred to as C1 through C8 as illustrated in FIG. 5A, the crosstalk components Ye", G", and Cy" may be expressed respectively by Equation 9 below.

$$Ye''=C2+C6$$

$$G''=C4+C8$$

$$Cy''=C1+C3+C5+C7 \qquad \text{[Equation 9]}$$

If an optical signal transmitted by the first yellow filter pixel when no crosstalk is generated is referred to as Ye, an optical signal Ye1' that may be transmitted by the first yellow filter pixel in the presence of crosstalk may be expressed by Equation 10 below.

$$Ye1'=Ye+Ye''+G''+Cy'' \qquad \text{[Equation 10]}$$

Here, the crosstalk components Cy" from the cyan filter pixels diagonally adjacent to the first yellow filter pixel may be ignored as they may be small when compared to the crosstalk components Ye" and G".

Figure 5B:
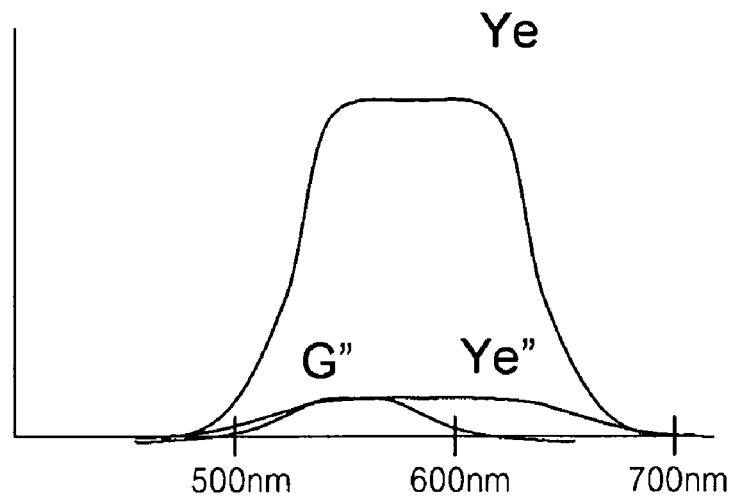

FIG. 5B is a graph showing the spectral characteristics of the first yellow filter pixel and the crosstalk components Ye" and G" that may influence the first yellow filter pixel. The horizontal axis denotes wavelength (in nanometers) and the vertical axis denotes photosensitivity. Since the crosstalk components G" generated from the green filter pixels may have different spectrums from the first yellow filter pixel, it may be predicted that the spectral characteristic of the first yellow filter pixel may be changed due to the crosstalk G" generated from the green filter pixels.

Figure 5C:
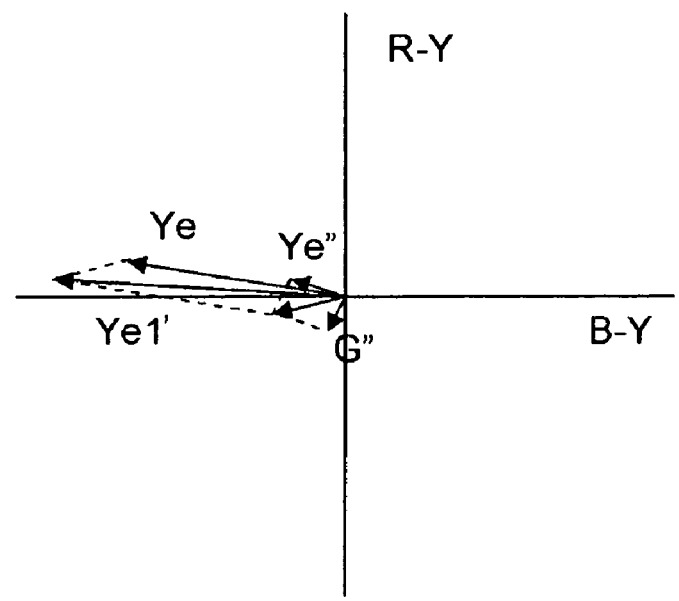

FIG. 5C illustrates Ye, Ye1', Ye", and G" in vector form in a color space, as well as a fifth vector representing the vector sum of Ye"+G". The optical signal Ye that is transmitted by the first yellow filter pixel without being influenced by crosstalk may be shifted to Ye1' due to the crosstalk Ye" caused by the adjacent second yellow filter pixels and the crosstalk G" caused by the adjacent green filter pixels. Here, there may be a phase shift between Ye and Ye1' due to crosstalk, but the vector magnitude may be hardly changed, and thus it may be that the magnitude of the optical signal may not be decreased. However, the phase difference between Ye and Ye1' may indicate that the spectral characteristic of the optical signal may have changed due to crosstalk. Thus, in example embodiments, in order to return to Ye that is not influenced by crosstalk, the influence of crosstalk may be compensated in advance.

First, a process of calculating phase to be shifted for compensating in the color space of FIG. 5C will be described using exemplary values. The magnitudes of Ye" and G" may be assumed to be −16 dB (=0.15), respectively.

Figure 5D:
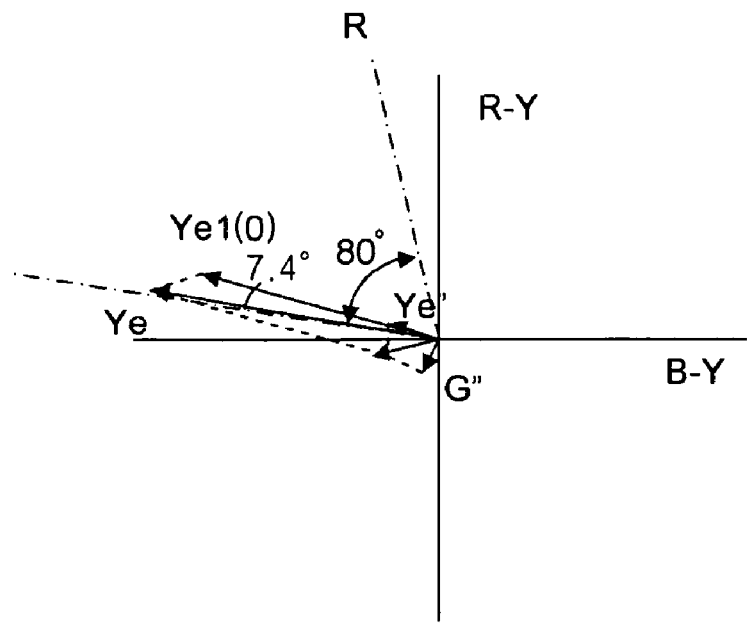
Figure 5E:
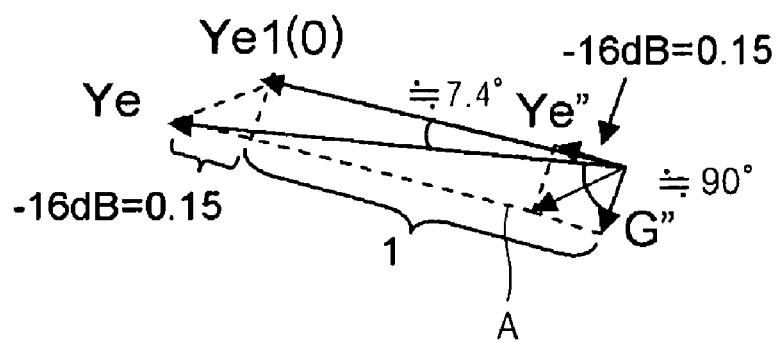

FIG. 5E illustrates Ye, Ye1(0), Ye", and G", as well as a fifth vector representing the vector sum of Ye"+G". Assuming that a triangle formed of G", Ye", and the vector sum (G"+Ye") may be shifted toward an end point of Ye as FIG. 5E, a base of the triangle is equal to the size of Ye", 0.15, and thus it may be indicated that the length of a support line A is 1.15. Consequently, an angle between Ye vector and G" vector is $\tan^{-1}(1.15/0.15)=82.6°$ (approximately). An angle between Ye1(0) and G" can be regarded as 90°, and an angle between Ye and Ye1(0) may be 7.4° (approximately). Accordingly, it may be indicated that Ye needs to be shifted in advance by approximately 7.4° toward red (R).

Figure 5F:
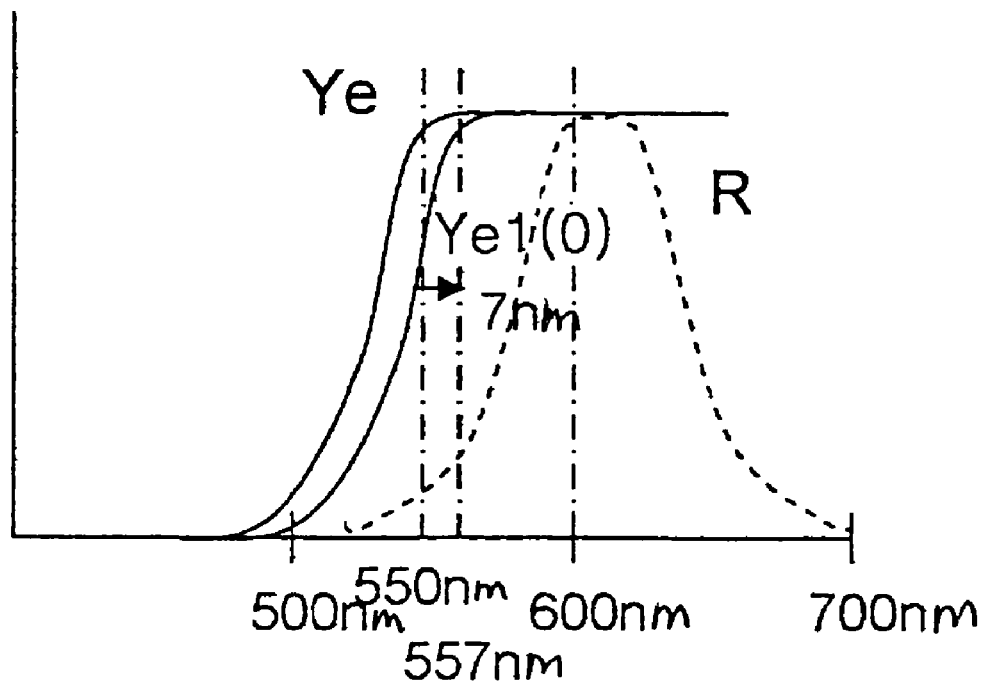

By referring FIGS. 5D and 5F, the shift amount of the spectral characteristic of the first yellow filter pixel on a frequency (wavelength) axis may be calculated. The shift amount may be calculated using the vector and spectral characteristics representing red (R) in order to convert the phase in the color space into values on the frequency (wavelength) axis. Red (R) may be present in a color space having an angle of approximately 80° with a Ye vector, as illustrated in FIG. 5D. Also, as illustrated in FIG. 5F, red (R) may have a spectral characteristic having a maximum photosensitivity at a wavelength of about 600 nm. As G is shifted away from the red (R) due to the crosstalk Ye" and Cy", in order to compensate the crosstalk effect, the spectral characteristic of the yellow filter pixel may need to be shifted by approximately 7.4° toward the red (R) in the color space. A frequency (wavelength) interval corresponding to approximately 7.4° in the color space may be calculated using Equation 11 below (in which 550 nm may represent, for example, a wavelength corresponding to a lower cutoff frequency of Ye1(0)).

$$\Delta(Ye1)=(600\text{ nm}-550\text{ nm})*(7.4°/80°)=4.63\text{ nm} \qquad \text{[Equation 11]}$$

Accordingly, the spectral characteristic of the first yellow filter pixel should be Ye1(0) that may be shifted by about 4.63 nm in a direction to red (R) from Ye, as illustrated in FIG. 5F.

FIGS. 6A through 6D illustrate a process of calculating a frequency characteristic of a second yellow pixel, for compensating influence of crosstalk on the second yellow filter pixel in advance, according to example embodiments.

Figure 6A:
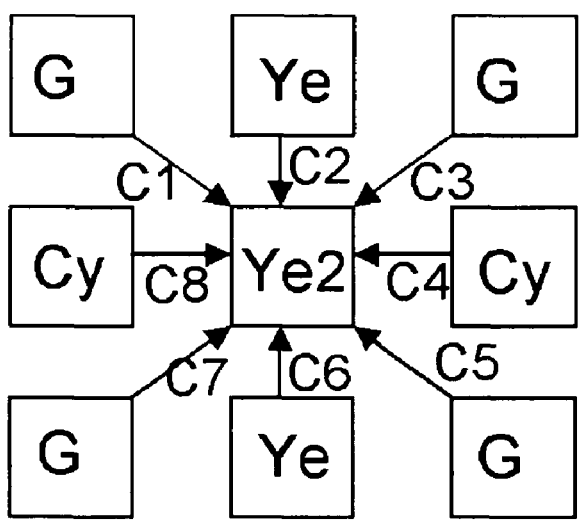
FIGS. 6A through 6D illustrate a process of calculating a frequency characteristic of a second yellow filter pixel, for compensating influence of crosstalk on the second yellow filter pixel in advance, according to example embodiments.

FIG. 6A illustrates a second yellow filter pixel and pixels adjacent thereto. The second yellow filter pixel may be influenced by crosstalk generated from first yellow filter pixels above and below the second yellow filter pixel, cyan filter pixels on the left and right of the second yellow filter pixel, and/or green filter pixels diagonally adjacent to the second yellow filter pixel. Crosstalk components from the first yellow filter pixels above and below the second yellow filter pixel may be referred to as Ye", crosstalk components from the cyan filter pixels on the left and right of the second yellow filter pixel may be referred to as Cy", and crosstalk components from the green filter pixels diagonally adjacent to the second yellow filter pixel may be referred to as G". Also, when the crosstalk components from all of the adjacent pixels are referred to as C1 through C8 as illustrated in FIG. 6A, the crosstalk components Ye", G", and Cy" may be expressed respectively in Equation 12 below.

$$Ye''=C2+C6$$

$$Cy''=C4+C8$$

$$G''=C1+C3+C5+C7 \qquad \text{[Equation 12]}$$

If an optical signal transmitted by the second yellow filter pixel when no crosstalk is generated is referred to as Ye, an optical signal Ye2' that may be transmitted by the second yellow filter pixel in the presence of crosstalk may be expressed by Equation 13 below.

$$Ye2'=Ye+Ye''+G''+Cy'' \qquad \text{[Equation 13]}$$

Here, the crosstalk components G" from the green filter pixels diagonally adjacent to the second yellow filter pixel may be ignored as they may be small when compared to the crosstalk components Ye" and Cy".

Figure 6B:
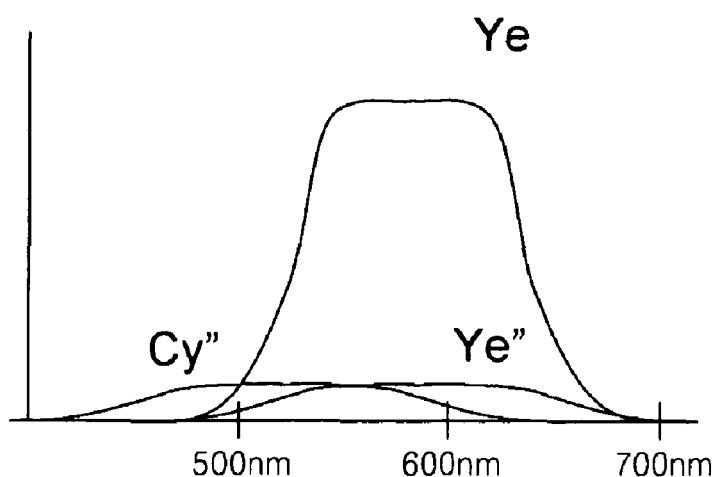

FIG. 6B is a graph showing the spectral characteristics of the second yellow filter pixel and the crosstalk components Ye" and Cy" that may influence the second yellow filter pixel. The horizontal axis denotes wavelength (in nanometers) and the vertical axis denotes photosensitivity. Since the crosstalk components Cy" generated from the cyan filter pixels may have different spectral characteristic from the second yellow filter pixel, it may be predicted that the spectral characteristic of the second yellow filter pixel may be changed due to crosstalk generated from the cyan filter pixel.

Figure 6C:
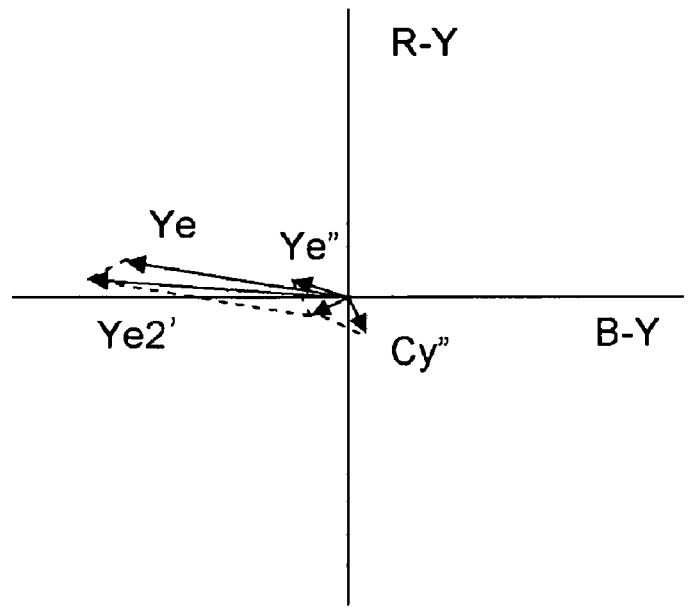

FIG. 6C illustrates Ye, Ye2', Ye", and Cy" in vector form in a color space, as well as a fifth vector representing the vector sum of Ye"+Cy". An optical signal Ye that may denote an optical signal transmitted through the second yellow filter pixel involving no crosstalk effect may be shifted to Ye2' due to crosstalk Ye" caused by the adjacent yellow filter pixels and/or crosstalk Cy" caused by the adjacent cyan filter pixels. Here, Ye may be phase-shifted due to crosstalk, but the vector magnitude may hardly be changed, and thus it may be understood that the magnitude of the optical signal may not be decreased. However, Ye may be phase-shifted to Ye2', which may indicate the spectral characteristic of the optical signal may have been changed due to crosstalk. Thus, according to example embodiments, in order to recover Ye from Ye2', the influence of crosstalk may be compensated in advance.

In this regard, a process of calculating phase to be shifted in the color space of FIG. 6C will be described using exemplary values. The magnitude of Ye" and Cy" may be assumed to be −16 dB (=0.15), respectively.

Figure 6D:
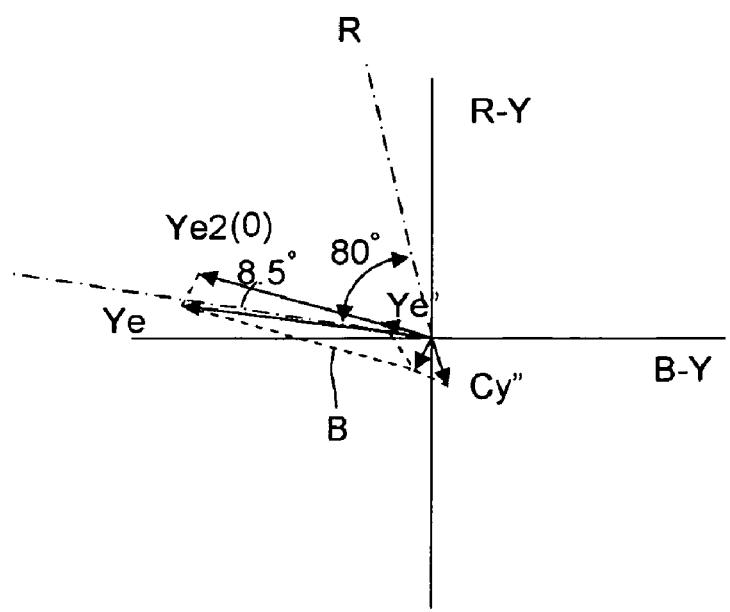

FIG. 6D illustrates Ye, Ye2(0), Ye", and Cy", as well as a fifth vector representing the vector sum of Ye"+Cy". Assuming that an angle between Ye2(0) and Cy" may be approximately 120°, and a resultant vector from summing vectors Ye" and Cy" may be perpendicular to a base line B and a magnitude thereof may be approximated to be −16 dB (=0.15), an angle between the vector Ye and the resultant vector may be $\tan^{-1}(1.00/0.15)=81.5°$ (approximately). Accordingly, an angle between Ye2(0) and Ye may be 8.5° (approximately). Accordingly, Ye may be shifted to Ye2(0) in advance by approximately 8.5°.

Comparing Ye1(0) and Ye2(0), the phases of Ye1(0) and Ye2(0) may be almost similar and thus their spectral characteristics may be regarded as identical. That is, also in the case of Ye2(0), the spectral characteristic of Ye may be shifted by about 4.63 nm toward red (R). However, since the magnitudes of Ye1(0) and Ye2(0) may be different, the pixel characteristics of the first yellow filter pixel and the second yellow filter pixel may be different in intensity of transmitted optical signal. In this case, a horizontal line may be generated, in every horizontal line between the first yellow filter pixel and the second yellow filter pixel, as noise. According to example embodiments, in order to remove the horizontal line, the optical signal transmitted through the first yellow pixel and that transmitted through the second yellow pixel may be averaged. Alternatively, the signal transmitted through the first yellow filter pixel and the signal transmitted through the second yellow filter pixel may be passed through a low pass filter.

As described above, by using a color filter array including a lot of green components in common and compensated in advance for the crosstalk effect, an image sensor that not only alleviates decrease in intensity of output optical signals, but improves color reproducibility as well, may be obtained.

Figure 7:
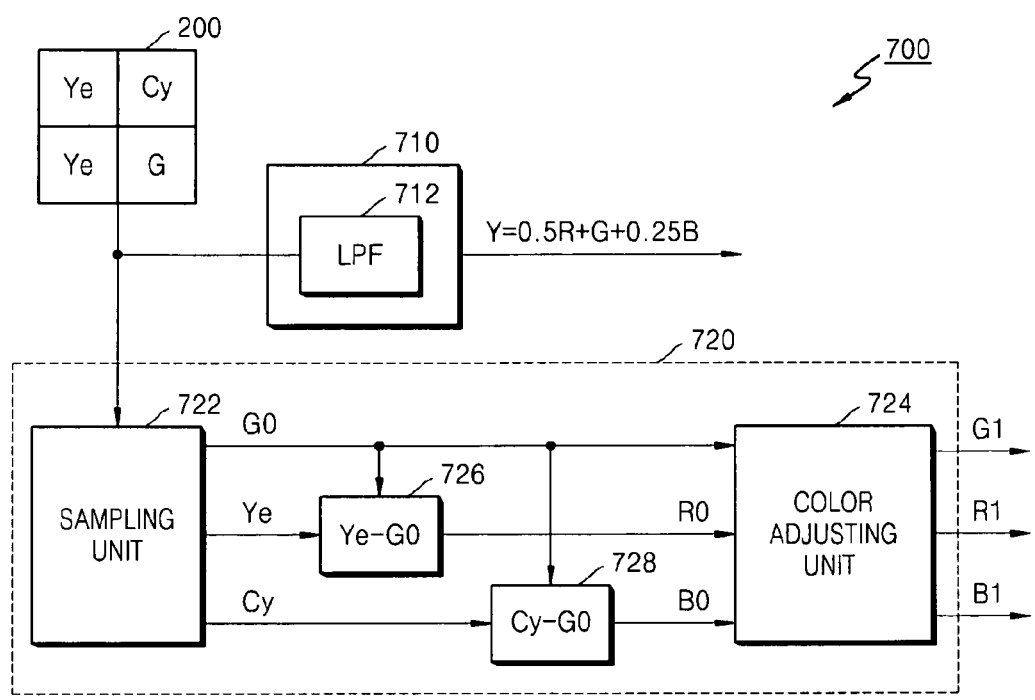
FIG. 7 illustrates a signal processing unit according to example embodiments.

FIG. 7 illustrates a signal processing unit 700 according to example embodiments. The signal processing unit 700 may comprise luminance output unit 710 and/or color converting unit 720.

An image sensor may convert a received optical signal from the color filter array 200 into an electrical signal, and may output the electrical signal as a green output G, a red output R, and/or a blue output B. According to example embodiments, the signal processing unit 700 may convert an electrical signal for a unit pixel including a green output G, a yellow output Ye, and/or a cyan output Cy into a green output G, a red output R, and/or a blue output B to output them. Also, in order to process an optical signal, luminance may be required in addition to the green output G, the red output R, and/or the blue output B, and thus a luminance output may be calculated from the signal output from the unit pixel of the image sensor. The signal output from the unit pixel may be the sum of signals output from a green filter pixel, a yellow filter pixel, and/or a cyan filter pixel.

Luminance output unit 710 may output a signal output from the unit pixel of the image sensor as a luminance output. A luminance output may preferably be a signal that is output from the unit pixel and/or has passed through low pass filter 712.

Luminance refers to the degree of brightness of light. Luminance may be obtained by linear combination of a red output, a green output, and/or a blue output; an ideal linear combination expressing luminance may be as Equation 14 below.

$$Y=G+0.5R+0.25B \qquad \text{[Equation 14]}$$

Here, G, R, and B may denote the intensity of the green output, the red output, and the blue output, respectively, the coefficients may denote the ratio of weights (their absolute values may not be important).

According to example embodiments, the ratio of the surface areas of the yellow filter pixel, the green filter pixel, and the cyan filter pixel may be 2:1:1. Also, the yellow output Ye, the green output G, and/or the cyan output Cy may be expressed using the green output G, the red output R, and/or the blue output B, as in Equation 15 below.

$$Ye=G+R$$

$$G=G$$

$$Cy=G+B \qquad \text{[Equation 15]}$$

Since an output signal from a unit pixel may be 2Ye+G+Cy, it may also be expressed using R, G, and/or B, as in Equation 16 below.

$$2Ye + G + Cy = 2(G + R) + G + (G + B) \qquad \text{[Equation 16]}$$
$$= 4G + 2R + B$$
$$= 4(G + 0.5R + 0.25B)$$

Accordingly, without any calculation about the signal output from the unit pixel, luminance may be obtained by only passing the signal output from the pixel unit through low pass filter 712.

Color converting unit 720 may obtain green output G, red output R, and/or blue output B from a signal output from a unit pixel.

Color converting unit 720 may extract each signal from the output of unit pixels in which the yellow output, the green output, and/or the cyan output are added up, in sampling unit 722. Sampling unit 722 may output temporal green output G0, yellow output Ye, and/or cyan output Cy. Yellow output Ye and/or cyan output Cy may need to be respectively converted to temporal red output R0 and/or temporal blue output B0. Yellow output Ye may be converted into temporal red output R0 by subtracting temporal green output G0 from yellow output Ye (see 726). Cyan output Cy may be converted into temporal blue output B0 by subtracting temporal green output G0 from cyan output Cy (see 728).

Color adjusting unit 724 may calculate green output G1, red output R1, and/or blue output B1 from temporal green output G0, temporal red output R0, and/or temporal blue output B0 in order to improve the color purity of temporal green output G0, temporal red output R0, and temporal blue output B0 and the color reproducibility of the image sensor. Color adjusting unit 724 may perform a matrix calculation as expressed by Equation 17 below.

$$\begin{pmatrix} R1 \\ G1 \\ B1 \end{pmatrix} = \begin{pmatrix} K11 & K12 & K13 \\ K21 & K22 & K23 \\ K31 & K32 & K33 \end{pmatrix} \begin{pmatrix} R0 \\ G0 \\ B0 \end{pmatrix} \qquad \text{[Equation 17]}$$

Here, the greater the color purity of temporal green output G0, temporal red output R0, and/or temporal blue output B0, the closer the diagonal elements (K11, K22, K33) of the matrix to 1, and the rest of the elements (K12, K13, K21, K23, K31, K33) to 0. If the color purity of temporal red output R0, temporal green output G0, and/or temporal blue output B0 is low, the diagonal elements (K11, K22, K33) are increased and the absolute value of the other elements (K12, K13, K21, K23, K31, K33) increase, i.e., not 0. As a result, the signal is amplified and the noise level increases, thus decreasing the SNR and the color reproducibility.

According to example embodiments, by increasing color purity of temporal red output R0, temporal green output G0, and/or temporal blue output B0 by compensating the influences of crosstalk in a color filter array in advance, the diagonal elements (K11, K22, K33) may obtain a value close to 1 and the rest of the elements (K12, K13, K21, K23, K31, K33) a value close to 0.

Figure 8:
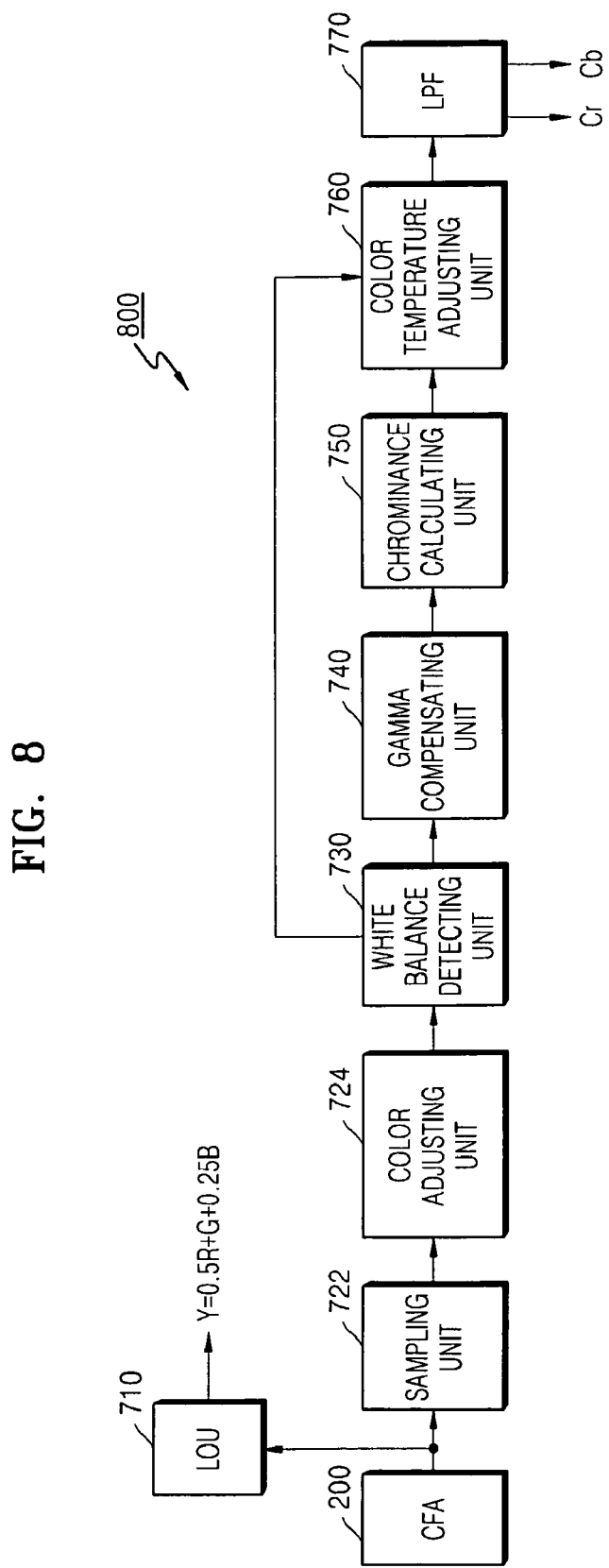
FIG. 8 illustrates another signal processing unit according to example embodiments.

FIG. 8 illustrates a signal processing unit 800 according to example embodiments.

Signal processing unit 800 according to example embodiments may further comprise white balance detecting unit 730 and color temperature adjusting unit 760. A color temperature means the temperature at which the heated black-body radiator matches the color of the light source, in units of Kelvin (K).

According to example embodiments, white balance of red output R1, green output G1, and/or blue output B1 may be detected in white balance detecting unit 730. Also, in gamma compensating unit 740, the white balance and gradation of red output R1, green output G1, and blue output B1 may be compensated. Chrominance calculating unit 750 may calculate chrominance signals Cr and/or Cb from the output of gamma compensating unit 740. Color temperature adjusting unit 760 may compensate the color temperature of chrominance signals Cr and Cb output from chrominance calculating unit 750 based on the outputs of white balance detecting unit 730. The compensation of the color temperature will now be described with reference to FIG. 9.

Figure 9:
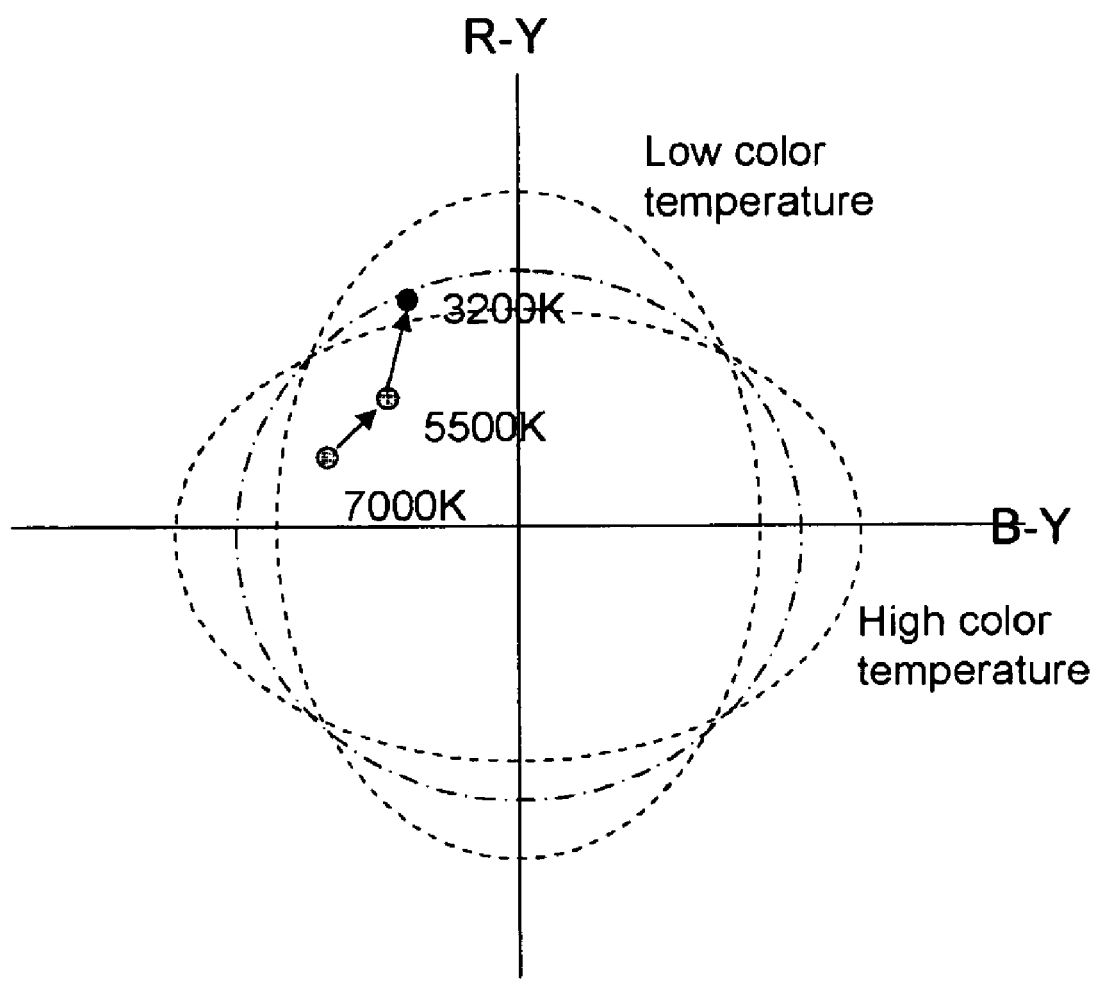
FIG. 9 illustrates variations of color reproductivity due to color temperature.

FIG. 9 illustrates variations of color reproducibility due to color temperature. At low color temperatures, color reproducibility is concentrated on a R-Y axis, and at high color temperatures, color reproducibility is concentrated on a B-Y axis. Accordingly, in order to compensate the color temperature, at the low color temperatures, a gain on the B-Y axis may be increased and/or a gain on the R-Y axis may be reduced, while at the high color temperatures, the gain on the B-Y axis may be reduced and the gain on the R-Y may be increased.

Chrominance calculating unit 750 may be realized as a matrix multiplication, for example, in Equation 18 below.

$$\begin{pmatrix} R-Y \\ B-Y \end{pmatrix} = \begin{pmatrix} J11 & J12 \\ J21 & J22 \end{pmatrix} \begin{pmatrix} R-Y' \\ B-Y' \end{pmatrix} \qquad \text{[Equation 18]}$$

In example embodiments, R-Y' and B-Y' respectively denote chrominance signals Cr and Cb that are output from chrominance calculating unit 750, and R-Y and B-Y denote compensated chrominance signals. Chrominance signals Cr and Cb may be processed, in turn, in color temperature adjusting unit 760 and/or low pass filter 770, thereby eliminating noise, and may be output as outputs of signal processing unit 800.

According to example embodiments, photosensitivity can be improved and a signal-to-noise ratio (SNR) may be improved.

Also, the influence of crosstalk is compensated in advance to reduce the gain of amplification in the digital signal processing unit, thereby preventing amplification of noise and improving color reproducibility ratio.

While example embodiments have been particularly shown and described, it will be understood by those of ordinary skill in the art that various changes in form and details may be made therein without departing from the spirit and scope of the present invention as defined by the following claims.

What is claimed is:
1. An image sensor, comprising:
a microlens;
a color filter array; and
a photo sensing unit;
wherein the microlens is adapted to gather optical signals incident from a light source,
wherein the color filter array is adapted to receive the optical signals that have passed through the microlens,
wherein the color filter array is further adapted to transmit only optical signals within a frequency range,
wherein the photo sensing unit is adapted to receive the optical signals from the color filter array in order to generate electrical signals depending on an intensity of the optical signals,
wherein the color filter array comprises:
two or more yellow filter pixels;
one or more green filter pixels; and
one or more cyan filter pixels;
wherein the two or more yellow filter pixels are disposed consecutively in a first row or rows in a first direction, wherein the one or more green filter pixels and the one or more cyan filter pixels are disposed in a second row or rows in the first direction, wherein the first row or rows and the second row or rows alternate in a second direction perpendicular to the first direction, and wherein in the second direction, either the one or more green filter pixels and at least one of the two or more yellow filter pixels alternate or the one or more cyan filter pixels and at least one of the two or more yellow filter pixels alternate.

2. The image sensor of claim 1, wherein an area ratio of the two or more yellow filter pixels, the one or more green filter pixels, and the one or more cyan filter pixels is 2:1:1.

3. The image sensor of claim 1, wherein the color filter array is formed of unit pixels, wherein each unit pixel comprises four sub-pixels, wherein each sub-pixel is arranged in a 2×2 matrix formation, wherein two of the sub-pixels in the matrix formation correspond to two of the two or more yellow filter pixels disposed in the first direction, and wherein the other two sub-pixels in the matrix formation correspond to one of the one or more green filter pixels and one of the one or more cyan filter pixels disposed in the first direction.

4. The image sensor of claim 3, wherein the two or more yellow filter pixels, the one or more green filter pixels, and the one or more cyan filter pixels have spectral characteristics previously compensated by adjusting kind and ratio of pigments of the two or more yellow filter pixels, the one or more green filter pixels, and the one or more cyan filter pixels so as to offset crosstalk effects due to adjacent sub-pixels of at least one of the sub-pixels.

5. The image sensor of claim 1, wherein the image sensor is a complimentary metal oxide semiconductor (CMOS) image sensor (CIS).

6. An image pickup apparatus comprising the image sensor of claim 1.

7. The image pickup apparatus of claim 6, wherein an area ratio of the two or more yellow filter pixels, the one or more green filter pixels, and the one or more cyan filter pixels is 2:1:1.

8. A color filter array, comprising:
two or more yellow filter pixels;
one or more green filter pixels; and
one or more cyan filter pixels;

wherein the two or more yellow filter pixels are disposed consecutively in a first row or rows in a first direction, wherein the one or more green filter pixels and the one or more cyan filter pixels are disposed in a second row or rows in the first direction, wherein the first row or rows and the second row or rows alternate in a second direction perpendicular to the first direction, and wherein in the second direction, either the one or more green filter pixels and at least one of the two or more yellow filter pixels alternate or the one or more cyan filter pixels and at least one of the two or more yellow filter pixels alternate.

9. The color filter array of claim 8, wherein an area ratio of the two or more yellow filter pixels, the one or more green filter pixels, and the one or more cyan filter pixels is 2:1:1.

10. The color filter array of claim 8, wherein the color filter array is formed of unit pixels, wherein each unit pixel comprises four sub-pixels, wherein each sub-pixel is arranged in a 2×2 matrix formation, wherein two of the sub-pixels in the matrix formation correspond to two of the two or more yellow filter pixels disposed in the first direction, and wherein the other two sub-pixels in the matrix formation correspond to one of the one or more green filter pixels and one of the one or more cyan filter pixels disposed in the first direction.

11. An image sensor comprising the color filter array of claim 8.

12. The image sensor of claim 11, wherein an area ratio of the two or more yellow filter pixels, the one or more green filter pixels, and the one or more cyan filter pixels is 2:1:1.

13. An image pickup apparatus comprising the color filter array of claim 8.

14. The image pickup apparatus of claim 13, wherein an area ratio of the two or more yellow filter pixels, the one or more green filter pixels, and the one or more cyan filter pixels is 2:1:1.

15. An image pickup apparatus, comprising:
an image sensor including a color filter; and
a signal processing unit;
wherein the color filter comprises:
two or more yellow filter pixels;
one or more green filter pixels; and
one or more cyan filter pixels;

wherein the two or more yellow filter pixels are disposed consecutively in a first row or rows in a first direction, wherein the one or more green filter pixels and the one or more cyan filter pixels are disposed in a second row or rows in the first direction, wherein the first row or rows and the second row or rows alternate in a second direction perpendicular to the first direction, wherein in the second direction, either the one or more green filter pixels and at least one of the two or more yellow filter pixels alternate or the one or more cyan filter pixels and at least one of the two or more yellow filter pixels alternate, wherein the image sensor outputs signals with respect to sub-pixels for each pixel, wherein the signal processing unit is adapted to convert the signals output from each of the pixels into a red output, a green output, and a blue output, and wherein the signal processing unit is further adapted to output the red output, the green output, and the blue output.

16. The image pickup apparatus of claim 15, wherein the signal processing unit comprises:

a luminance output unit adapted to output the output signals from each of the pixels as luminance output; and a color converting unit adapted to output a temporal green output from the one or more green filter pixels, adapted to output a temporal red output obtained by subtracting the temporal green output from the output signal of the two or more yellow filter pixels, and adapted to output a temporal blue output by subtracting the temporal green output from the output signal of the one or more cyan filter pixels.

17. The image pickup apparatus of claim 16, wherein the luminance output unit comprises a low pass filter, and wherein the luminance output unit outputs the luminance output by passing the output signals from each of the pixels through the low pass filter.

18. The image pickup apparatus of claim 16, wherein the color converting unit comprises a color adjusting unit adapted to output green, red, and blue outputs, purity of which are enhanced by linear combinations of the temporal green, red, and blue outputs from the color converting unit.

19. The image pickup apparatus of claim 18, further comprising:
a color temperature adjusting unit adapted to detect color temperatures of the green output, the red output, and the blue output using white balance of the outputs of the color adjusting unit, adapted to detect chrominance signals from the color temperature, adapted to adjust the color temperatures of the green output, the red output, and the blue output, and adapted to output the green output, the red output, and the blue output.

20. The image pickup apparatus of claim 15, wherein the image sensor is a complimentary metal oxide semiconductor (CMOS) image sensor (CIS).

* * * * *